United States Patent [19]
Saito et al.

[11] Patent Number: 5,826,907
[45] Date of Patent: Oct. 27, 1998

[54] VEHICLE ENERGY ABSORBING STRUCTURE

[75] Inventors: Kenichi Saito; Tetsuo Maki; Satoru Yoshikawa; Satoru Ichikawa, all of Kanagawa-ken, Japan

[73] Assignee: Nissan Motor Co., Ltd., Yokohama, Japan

[21] Appl. No.: 802,519

[22] Filed: Feb. 20, 1997

[30] Foreign Application Priority Data

Feb. 20, 1996 [JP] Japan ................................. 8-032354

[51] Int. Cl.⁶ .................................................. B60R 22/00
[52] U.S. Cl. ........................ 280/808; 280/751; 280/801.1
[58] Field of Search ............................. 280/801.1, 805, 280/808, 751

[56] References Cited

U.S. PATENT DOCUMENTS

| | | | |
|---|---|---|---|
| 4,389,059 | 6/1983 | Stephenson | 280/808 |
| 4,955,639 | 9/1990 | Yamamoto | 280/808 |
| 5,433,478 | 7/1995 | Naruse | 280/751 |
| 5,529,344 | 6/1996 | Yasui et al. | 280/808 |
| 5,685,566 | 11/1997 | Hirase et al. | 280/801.1 |

*Primary Examiner*—Kenneth R. Rice
*Attorney, Agent, or Firm*—Foley & Lardner

[57] ABSTRACT

A novel vehicle energy absorbing structure is disclosed, in which a hard member has a portion facing the compartment, a cover having a substantially U-shaped section is provided to cover the compartment side of the hard member, and an energy absorbing member is interposed between the cover and the hard member to absorb energy by plastic deformation. At the time of deformation of the cover caused under a pressure load not less than a predetermined value, at least a trigger portion formed in the cover provides a momentum for plastic deformation of the energy absorbing member. Thus a compact vehicle energy absorbing structure is provided which can absorb a sufficient amount of load.

12 Claims, 8 Drawing Sheets

VEHICLE ENERGY ABSORBING STRUCTURE

BACKGROUND OF THE INVENTION

The present invention relates to a vehicle energy absorbing structure.

Conventional vehicle energy absorbing structures include those used for a seat belt anchor of an automotive seat belt apparatus, for example, and the one disclosed in Japanese Patent Laid-Open No. 7-149204.

The seat belt anchor for the automotive seat belt apparatus comprises a seat belt anchor plate for supporting the seat belt, a bolt member for fixing the seat belt anchor plate, a rail embedded in a center pillar, a slider arranged in the center pillar in a vertically movable fashion along the rail, a nut member into which the bolt member fixed on the slider is forced, and a plate member arranged on the compartment side of the center pillar with an end thereof screwed to the slider.

The center pillar is formed with a vertically extending hole. A slider for supporting the nut member welded thereto is arranged in the center pillar. The nut member is protruded toward the compartment from the hole.

The plate member has an extension extending from an end thereof screwed to the slider to the other end.

The width of the extension along the longitudinal direction of the vehicle is smaller than the width of the center pillar hole along the longitudinal direction of the vehicle, and therefore the extension can be advanced into the hole along the transverse direction of the vehicle. The extension has a hole through which the nut member is adapted to pass through.

The other end of the plate member is passed through the hole formed in the slider and is caught in the slider outside of the hole.

The slider and the plate member are coupled with a slider plate. The coupling portion of the slider plate is in such a shape as to slide along the edges of the center pillar hole along the longitudinal direction of the vehicle, thereby preventing the slider from coming off.

A displaceable interval is formed between the rail and the slider, so that the other end of the plate member caught in the slider constitutes an energy absorbing means (vehicle energy absorbing structure).

A lock pin can be withdrawn by operating a lever with knob thereby to move the slider along the rail to an appropriated position. Releasing the knob, the lock pin is fitted in the engaging hole of the rail and is set in position.

The seat belt anchor plate and the bolt member are supported in such a manner as to be covered by a cap of synthetic resin.

The center pillar is covered by a garnish molding in such a manner as to be directly invisible from the vehicle compartment.

In this configuration, suppose a pressure load not less than a predetermined value is imposed on the cap outward from the compartment of the vehicle. The cap would be deformed and come into contact with the bolt member. The slider thus tends to be displaced in operatively interlocked relation with the bolt member and the nut member.

In view of the fact that an end of the plate member is screwed to the slider, the shock deceleration G with time changes in the manner shown in FIG. 14 and an initial load 153 is generated. Also, as the pressure load is exerted on the other end of the plate member, the other end is deformed and extended so that the slider comes off from the plate member, resulting in the unloading as designated by numeral 155 in FIG. 14.

In the process, the elongation change of the other end of the plate member absorbs the shock energy due to the pressure load.

With this structure, however, after the other end of the plate member is extended and deformed to such an extent that the slider comes off from the plate member, the lack of the means of absorbing the shock energy causes the shock deceleration G to rise again and the slider to come into contact with the rail. Thus a bottoming load 157 is introduced as shown in FIG. 14.

In order to prevent this phenomenon, i.e., prevent the slider from coming into contact with the rail, a large interval is required between the center pillar and the rail, thereby unavoidably increasing the lateral width of the center pillar. This in turn requires an improved field of view from the compartment outward of the vehicle.

As far as the lateral exterior width of the vehicle is restricted by law, the extension of the center pillar into the compartment reduces the lateral size of the compartment, thereby posing another problem to be improved.

SUMMARY OF THE INVENTION

The present invention has been developed in view of the above-mentioned facts, and the object of the invention is to provide a compact energy absorbing structure for vehicles which is capable of absorbing the shock energy sufficiently.

In order to achieve this object, according to the present invention, there is provided a vehicle energy absorbing structure comprising a hard member having a portion facing a compartment, a cover having a substantially U-shaped section for covering the compartment side of the hard member, and an energy absorbing member interposed between the cover and the hard member for absorbing a shock energy by plastic deformation, wherein the cover has a trigger portion formed therein for initiating the plastic deformation of the energy absorbing member when the cover is deformed under a pressure load not less than a predetermined value.

With this configuration, in the case where a pressure load not less than a predetermined value is exerted on the cover from the compartment side, the cover is deformed and the trigger portion of the cover provides a momentum for plastic deformation of the energy absorbing member. The resulting plastic deformation of the energy absorbing member can absorb the shock energy under the pressure load. Specifically, the plastic deformation of the energy absorbing member through the trigger portion can positively absorb the pressure load and therefore the stroke for absorbing the pressure load can be reduced. The energy absorbing member can thus be reduced in size and the compartment space can be enlarged.

On the other hand, the hard member is arranged within the substantially U-shaped section of the cover which has a portion adapted to deform away from the hard member under a pressure load. Also, the trigger portion can be formed in such a shape that the energy absorbing member is subjected to plastic deformation into a space defined by the hard member and the portion of the cover adapted to deform away from the hard member.

With this configuration, assume that the cover is deformed under a pressure load, the cover is deformed away from the hard member thereby to form a space, and the trigger portion can subject the energy absorbing member to plastic deformation into the particular space. Consequently, the plastic deformation of the energy absorbing member can be accomplished smoothly.

Further, the trigger portion can be so configured that the energy absorbing member is subjected to plastic deformation in a direction toward an inner surface of the cover.

With this configuration, the trigger portion can subject the energy absorbing member to plastic deformation toward the inner surface of the cover, so that the cover deformation can attain smooth plastic deformation of the energy absorbing member.

Also, the cover can be configured to have a vertical wall extending in a direction perpendicular to a surface of the hard member, and the trigger portion can be formed in the vertical wall so as to initiate an outward buckling under a pressure load not less than a predetermined value.

With this configuration, under a pressure load, the trigger portion causes the vertical wall of the cover to start to buckle outward and provides a momentum for plastic deformation of the energy absorbing member.

The energy absorbing member can also be configured to have a vertical wall extended in the direction perpendicular to the surface of the hard member and adapted to buckle under a pressure load not less than a predetermined value, in which the trigger portion constitutes a protrusion formed inside the cover and adapted to engage at least a part of the vertical wall for accelerating the buckling of the vertical wall under the pressure load.

With this configuration, under a pressure load, the protrusion engages at least a part of the vertical wall of the energy absorbing member and provides a momentum for plastic deformation, thereby positively buckling the energy absorbing member.

Also, the ends of the vertical wall of the energy absorbing member can be configured to be in contact with the cover and the hard member, respectively, and the end of the cover can be configured to be in contact with the hard member.

With this configuration, in the case where a pressure load not less than a predetermined value is imposed on the cover, the cover which is in contact with the hard member is readily deformed. Further, since the cover and the hard member are in contact with the ends, respectively, of the vertical wall of the energy absorbing member, the trigger portion can easily and positively provide a momentum for plastic deformation of the energy absorbing member. Specifically, in the case where a pressure load not less than a predetermined value is exerted on the cover, the cover comes into contact with the hard member, and thereby imparts a component force to expand outward the portion of the cover formed with the protrusion. Since the end of the energy absorbing member is in contact with the cover, the whole pressure load is directly applied to the vertical wall of the energy absorbing member. The energy absorbing member thus is expanded outward of the hard member by the protrusion. It is thus possible to subject the energy absorbing member to plastic deformation and to absorb the energy positively.

Also, the vertical wall of the cover can be configured to have the trigger portion formed at the intermediate portion thereof in such a shape as to expand outward.

With this configuration, in the case where a pressure load not less than a predetermined value is imposed on the cover, the vertical wall of the cover is readily deformed outward with the intermediate portion thereof expanded, and the trigger portion of the intermediate portion can readily subject the energy absorbing member to plastic deformation. As a consequence, the energy absorption efficiency can be improved further.

Further, the end of the vertical wall of the cover can be configured to engage the hard member.

With this configuration, in the case where a pressure load not less than a predetermined value is imposed on the cover, the fact that the end of the vertical wall of the cover is in mesh with the hard member causes the cover to be readily deformed outward, thereby providing a momentum for energy absorption. Consequently, the energy absorption efficiency can be improved further.

Furthermore, the vertical wall of the energy absorbing member can be configured to have a hollow portion interposed between the hard member and the cover and to have a trigger portion in the form of a cylinder protruding from the cover to the intermediate portion in the vertical wall with a soft foamed member arranged from the interior of the cylinder over the hard member.

With this configuration, in the case where a pressure load not less than a predetermined value is imposed on the cover, the soft foamed member is expanded sideways under the pressure load, and the cylindrical portion of the cover is deformed to expand outward by the expansion of the soft foamed member. In this way, the hollow vertical wall of the energy absorbing member can be positively subjected to plastic deformation, thereby further improving the energy absorption efficiency.

Also, the hard member can be configured to provide a fixing member for securing the seat belt anchor plate for supporting the seat belt to the pillar panel. The cover can also be configured to constitute a cap for covering the compartment side of the fixing member.

With this configuration, in the case where a pressure load not less than a predetermined value is imposed on the cap covering the fixing member for securing the seat belt anchor plate to the pillar panel, the trigger portion can subject the energy absorbing member to plastic deformation.

Further, the hard member can be configured to provide a vehicle frame member facing the compartment and the cover can be configured to provide a trim member for covering the frame member.

With this configuration, in the case where a pressure load not less than a predetermined value is imposed on the trim member for covering the vehicle frame member facing the compartment, the trigger portion can subject the energy absorbing member to plastic deformation by way of the deformation of the trim member.

DESCRIPTION OF THE PREFERRED EMBODIMENTS

Figure 1:
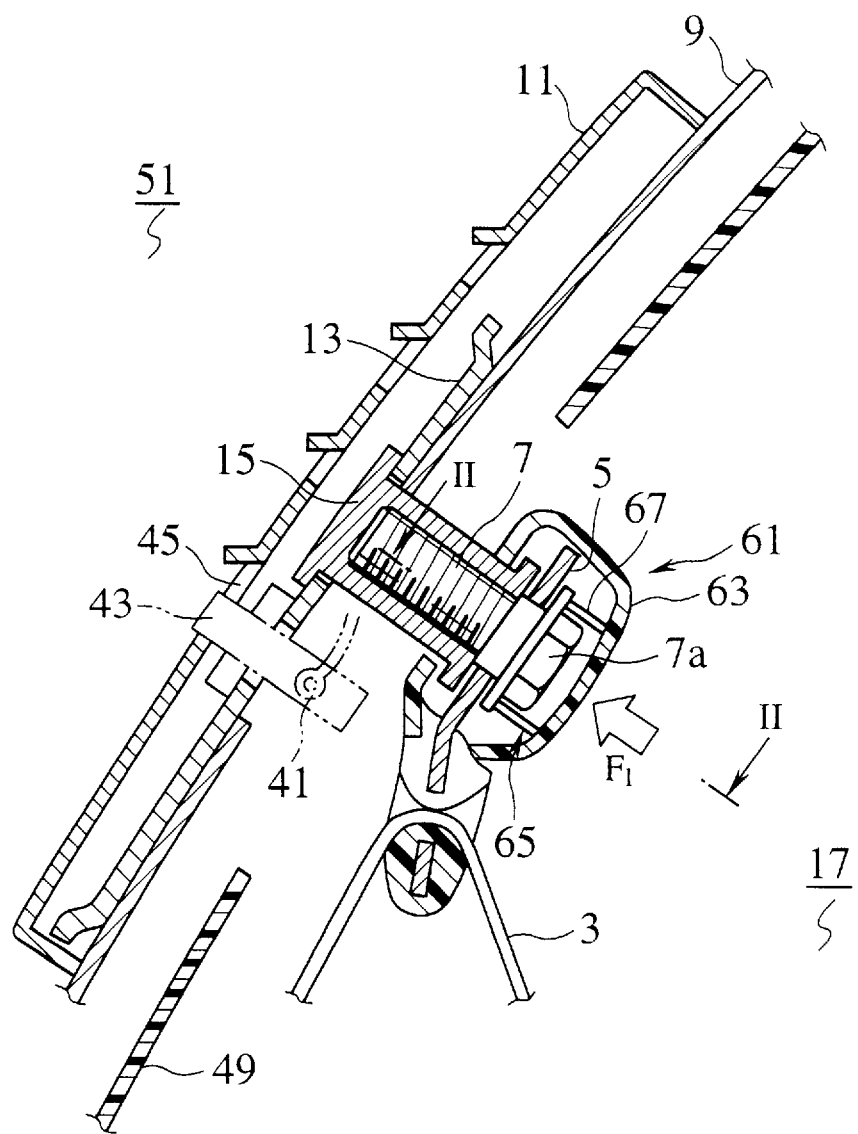
FIG. 1 is a sectional view for explaining an automotive seat belt apparatus according to a first embodiment of the invention.
Figure 2:
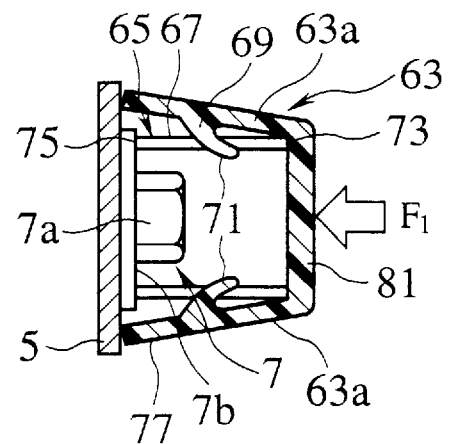
FIG. 2 is an enlarged sectional view taken along line II—II in FIG. 1.
Figure 3:
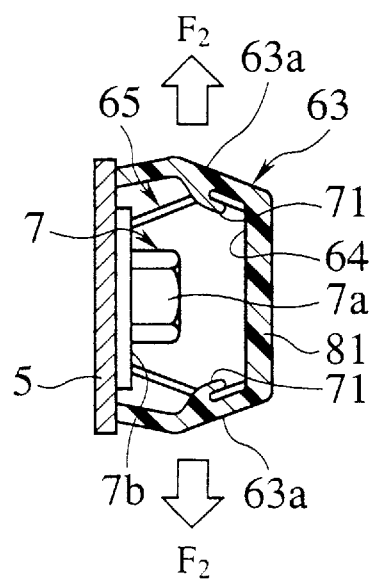
FIG. 3 is a diagram for explaining the operation with reference to FIG. 2.

Embodiments of the present invention will be described below with reference to the accompanying drawings.

(First Embodiment)

FIGS. 1 to 4 show a seat belt apparatus for automobiles according to a first embodiment of the invention. Specifically, a seat belt anchor 61 of the automotive seat belt apparatus includes a seat belt anchor plate 5 for supporting a seat belt 3, a bolt member 7 for fixing the seat belt anchor plate 5, a rail 11 embedded in a center pillar 9, a slider 13 movable vertically along the rail 11, a nut member 15 fixed on the slider 13 into which the fixing bolt member 7 is forced, and a hollow cap 63 of synthetic resin for covering the seat belt anchor plate 5 and the bolt member 7. A hollow cylindrical energy absorbing member 65 having a vertical wall 67 arranged coaxially with the bolt member 7 is arranged in the cap 63.

The vertical wall 67 is extended along the axial direction of the bolt member 7 providing the hard member, and is configured to buckle under a pressure load F1 not less than a predetermined value. As described above, the bolt member 7 according to this embodiment constitutes the hard member having a portion facing the compartment. The cap 63 makes up a cover having a substantially U-shaped section for covering the compartment side of the hard member.

Figure 4:
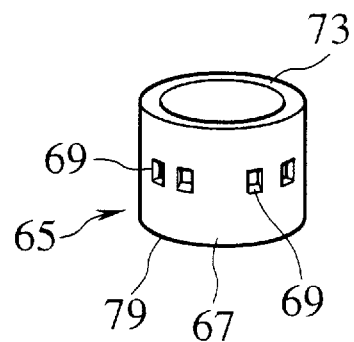
FIG. 4 is a perspective view for explaining the energy absorbing member shown in FIG. 1.

The vertical wall 67 of the energy absorbing member 65 is formed with a plurality of through holes 69 in appropriate positions as shown in FIG. 4. Protrusions 71 adapted to be fitted in the through holes 69 are formed in the cap 63. The protrusions 71 constitute a trigger portion for engaging and accelerating the deformation of the vertical wall 67 of the energy absorbing member 65 outward, i.e., in the direction perpendicular to the axis of the bolt member 7 under a pressure load. Also, the upper and lower ends 73, 75 of the vertical wall 67 of the energy absorbing member 65 are in contact with the cap 63 and the bottom 7b of the cap 63 on the head 7a side of the bolt member 7, respectively, and an end 77 of the cap 63 is in contact with the seat belt anchor plate 5.

The slider 13 can be moved to an appropriate position along the rail 11 by manipulating a lever 41 with a knob and thus pulling out the lock pin 43. Releasing the knob, the lock pin 43 comes to engage one of the engaging holes 45 of the rail 11 and set in position. Numeral 49 designates a garnish molding for covering the center pillar 9 invisibly from the compartment 17.

With the above-mentioned configuration according to the first embodiment, suppose that a pressure load F1 not less than a predetermined value (for example, 900 kg assuming that the head of an occupant weighs 4.5 kg under 200 G) is imposed on a ceiling 81 of the cap 63 from the compartment 17 in the direction 51 outward of the vehicle for some reason, the cap 63 comes into contact with the seat belt anchor plate 5, thereby imparting such a component force F2 as to expand the portions formed with the protrusions 71 outward (in the direction perpendicular to the direction of the pressure load F1). Specifically, when the cap 63 providing the cover is deformed under a pressure load, the side wall 63a is deformed away from the bolt member 7 constituting a hard member, so that the protrusions 71 constituting the trigger portion cause plastic deformation of the energy absorbing member 65 toward the space defined by the side wall 63a of the cap 63 and the bolt member 7 constituting the hard member. Consequently, the plastic deformation of the energy absorbing member 67 is smoothly accomplished.

Also, the trigger portion 71 is configured to control the plastic deformation of the energy absorbing member 67 toward the inner surface of the side wall 63a of the cap 63 constituting the inner surface of the cover. This is another factor that causes smooth plastic deformation of the energy absorbing member 67.

Further in view of the fact that the upper end 73 of the vertical wall 67 of the energy absorbing member 65 is in contact with the inner surface 64 of the cap 63, the pressure load F1 is directly applied to the vertical wall 67 of the energy absorbing member 65. The energy absorbing member 65 is in contact with the bolt member 7, and therefore the component force F2 causes the protrusions 71 to pull the vertical wall 67 of the energy absorbing member 65 thereby accurately providing a momentum for plastic deformation of the energy absorbing member 65 due to the buckling of the vertical wall 67 thereof.

The energy absorbing member 65 can thus be buckled easily and positively, and the resulting sufficient energy absorption can prevent the shock deceleration G from increasing and bottoming, thereby efficiently absorbing the shock energy under the pressure load F1. Also, since the shock energy is absorbed positively by the plastic deformation due to the buckling of the energy absorbing member 65, a large stroke is not required of the nut member 15 into which the bolt member 7 is forced. The center pillar 9 can thus be reduced in length along the transverse direction of the vehicle.

Figure 5:
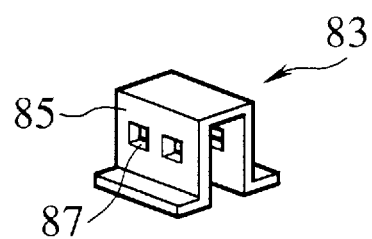
FIG. 5 is a perspective view for explaining another example of the energy absorbing member shown in FIG. 1.

According to the first embodiment, the energy absorbing member 65 is in the form of hollow cylinder as shown in FIG. 4. An energy absorption member 83 in substantially rectangular as shown in FIG. 5, however, can alternatively be employed with equal effect.

Numeral 87 designates a plurality of through holes formed at appropriate positions of the vertical wall 85 of the energy absorbing member 83. The protrusions 71 are adapted to be fitted in the through holes 87.

(Second Embodiment)

Figure 6:
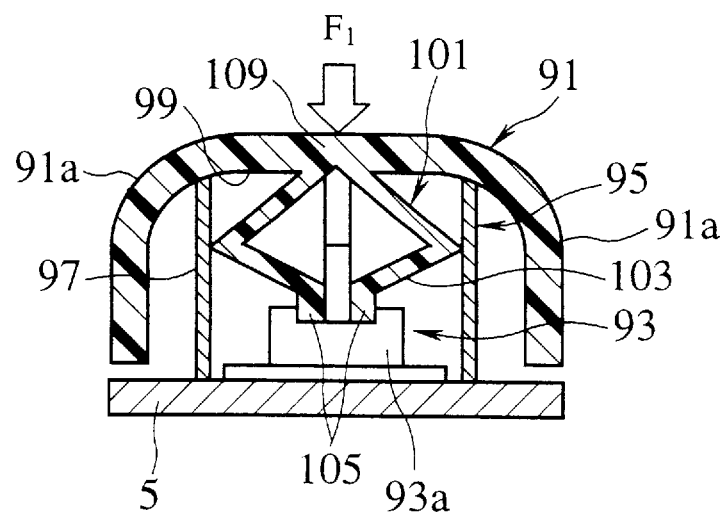
FIG. 6 is a sectional view for explaining the automotive seat belt apparatus according to a second embodiment of the invention.
Figure 7:
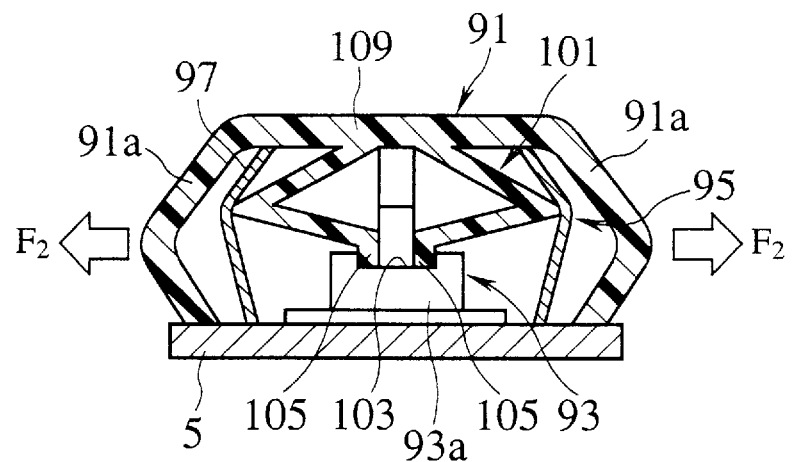
FIG. 7 is a diagram for explaining the operation of the apparatus shown in FIG. 6.
Figure 8:
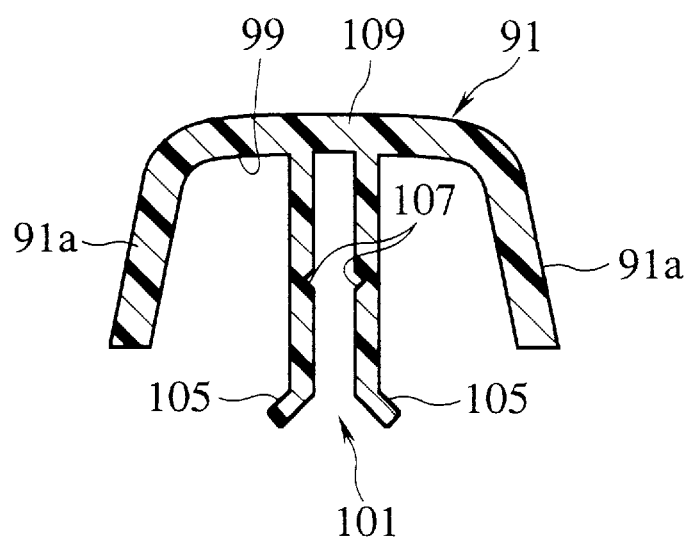
FIG. 8 is a sectional view for explaining the cap shown in FIG. 6 before being assembled.

FIGS. 6 to 8 show an automotive seat belt apparatus according to a second embodiment of the invention. The second embodiment is different from the first embodiment mainly in the structure of the trigger portion and the energy absorbing member.

A cap 91 providing a cover shown in FIGS. 6 and 7 has arranged therein a bolt member 93 constituting a hard member and a hollow energy absorbing member 95 having a vertical wall 97 along the same axis as the bolt member 93. Pantograph-like legs 101 in contact with the inner side of the vertical wall 97 of the energy absorbing member 95 is arranged on the inner surface 99 of the cap 91. The legs 101 according to this embodiment constitute protrusions for accelerating the deformation of the vertical wall 97 outward.

In free state before being mounted, the legs 101 are extended parallel from the inner surface 99 of the cap 91 as shown in FIG. 8, and have each lower end thereof formed with an engaging portion 105 adapted to engage the groove 103 of the head 93a of the bolt member 93. The legs 101 also have thin portions 107 in opposed relation to each other at the intermediate part thereof, i.e., at the substantial vertical center thereof. The thin portions 107 constitute a trigger portion according to the present embodiment. The legs 101 constitute the vertical wall of the cap 91 providing the cover. The legs 101, with the thin portions 107 formed at the intermediate parts thereof as a trigger portion, assume a pantograph-like shape with the intermediate parts thereof expanding outward.

According to the second embodiment, therefore, in the case where a pressure load F1 not less than a predetermined value is imposed on the ceiling 109 of the cap 91, the pressure load F1 is concentrated on the thin portions 107 of the pantograph-like legs 101 through the cap 91, so that the thin portions 107 move outward (in the direction perpendicular to the direction of the pressure load F1). As a consequence, the legs 101 push the vertical wall 97 of the energy absorbing member 95 outward and the component force F2 works to expand the vertical wall 97 of the energy absorbing member 95 outward thereby to buckle and deform the same.

In this way, an operation and an effect similar to the first embodiment can be accomplished by positive energy absorption. Also, according to this embodiment, since the legs 101 have an expanded shape and the engaging portion 105 engages the groove 103 of the bolt member 93, the legs 101 can be easily expanded and deformed along the direction of the component force F2 by the pressure load F1. The energy absorbing member 97 thus can be easily subjected to plastic deformation in the direction of F2. Further, the side wall 91a of the cap 91 constituting the cover is deformed in the direction F2 away from the bolt member 93 to form a space with the bolt member 93, and the energy absorbing member 97 is subjected to the plastic deformation into this particular space. Therefore, the plastic deformation of the energy absorbing member is facilitated and assured, and positive energy absorption is made possible.

(Third Embodiment)

Figure 9:
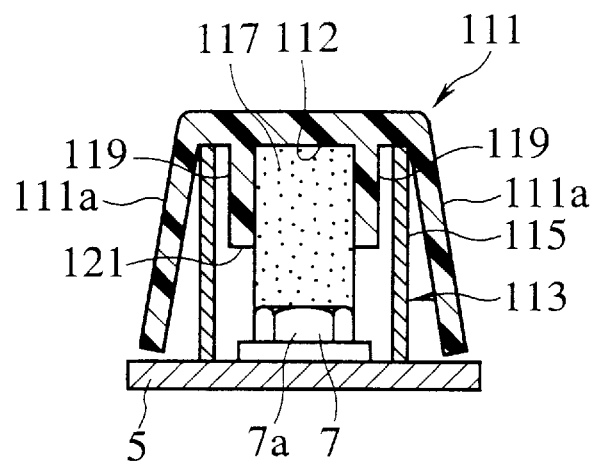
FIG. 9 is a sectional view for explaining the automotive seat belt apparatus according to a third embodiment of the invention.
Figure 10:
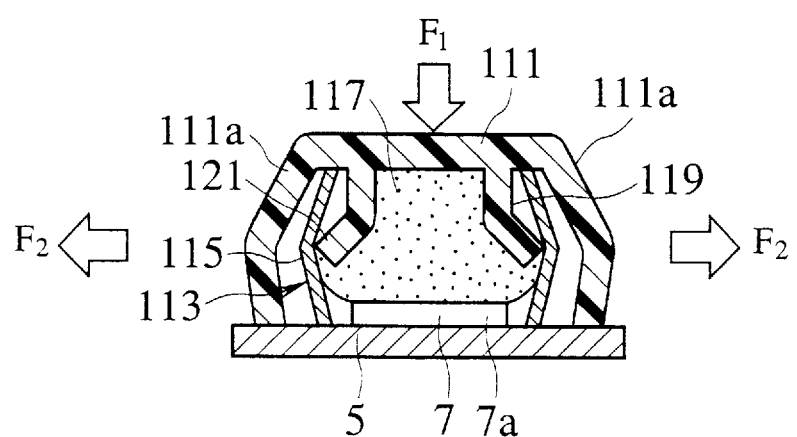
FIG. 10 is a diagram for explaining the operation of the apparatus shown in FIG. 9.

FIGS. 9 and 10 show an automotive seat belt apparatus according to a third embodiment of the invention. The difference of this embodiment from the first embodiment resides in the structure of the trigger portion and the energy absorbing member.

A bolt member 7 constituting a hard member and a hollow energy absorbing member 113 having a vertical wall 115 coaxial with the bolt member 7 are arranged in a cap 111 constituting a cover as shown in FIGS. 9 and 10. The vertical wall 115 of the energy absorbing member 113 has arranged therein a cylindrical portion 119 protruded from the cap 111 to a point corresponding to the intermediate portion of the vertical wall 115. Also, a soft foamed member 117 is suspended from the interior of the cylindrical portion 119 to the bolt member 7. The vertical end 121 of the cylindrical portion 119 is located at a point corresponding to the substantial vertical center of the energy absorbing member 113.

As a result, according to the third embodiment, in the case where a pressure load F1 not less than a predetermined value is imposed on the cap 111, the soft foamed member 117 is expanded sideways (in the direction perpendicular to the direction of the pressure load F1), so that the end 121 of the cylindrical portion 119 is deformed outward. The energy absorbing member 113 is thus pushed outward in the direction of the component force F2 thereby providing a momentum for initiating the plastic deformation thereof.

The plastic deformation of the energy absorbing member 113 thus assures the absorption of the pressure load and exhibits an operation and effect similar to the first and second embodiments.

According to this embodiment, energy can be absorbed also by the deformation of the soft foamed member 117, thereby making it possible to attain more efficient energy absorption.

Although the center pillar 2 was described with reference to each of the foregoing embodiments, any vehicle structural member for supporting the seat belt anchor plate can of course alternatively be used within the scope of the invention. The above-mentioned configuration can realize the practical effect of an automotive seat belt apparatus that can efficiently absorb the pressure load even with a small size of the cover with the pillar panel and the rail.

(Fourth Embodiment)

Figure 11:
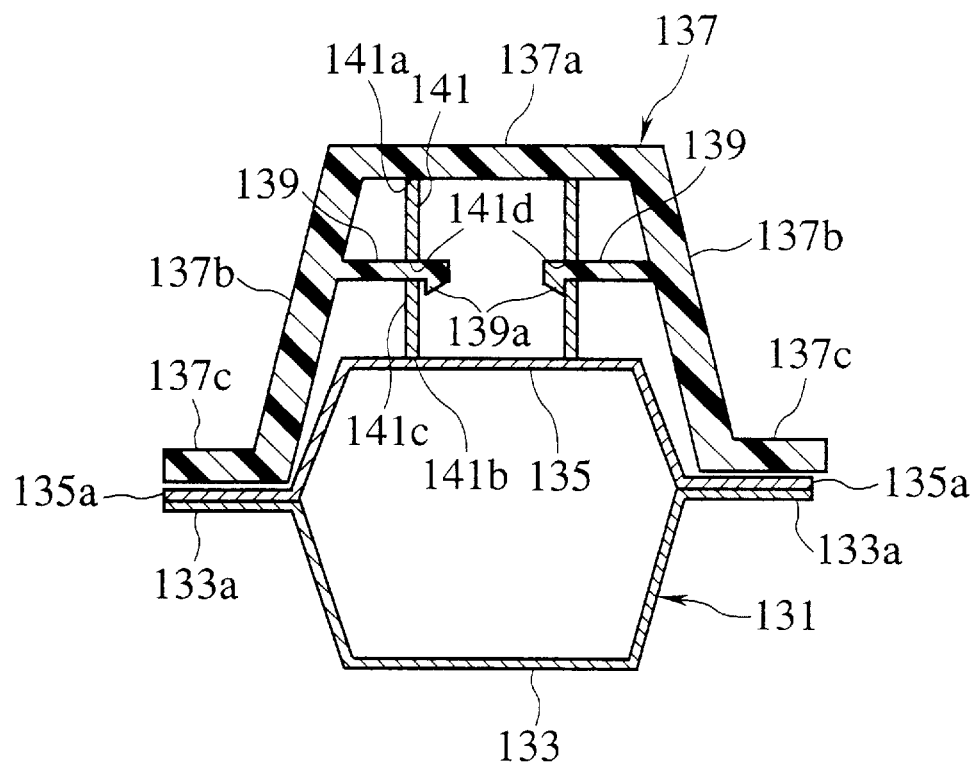
FIG. 11 is a sectional view for explaining the center pillar according to a fourth embodiment.
Figure 12:
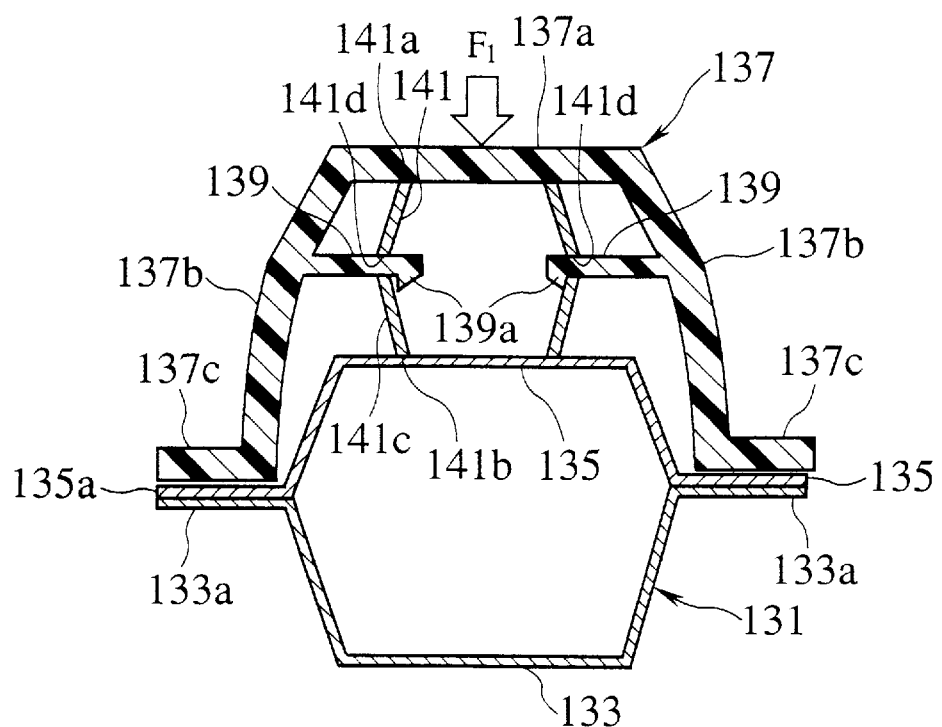
FIG. 12 is a diagram for explaining the operation of the center pillar shown in FIG. 11.
Figure 13:
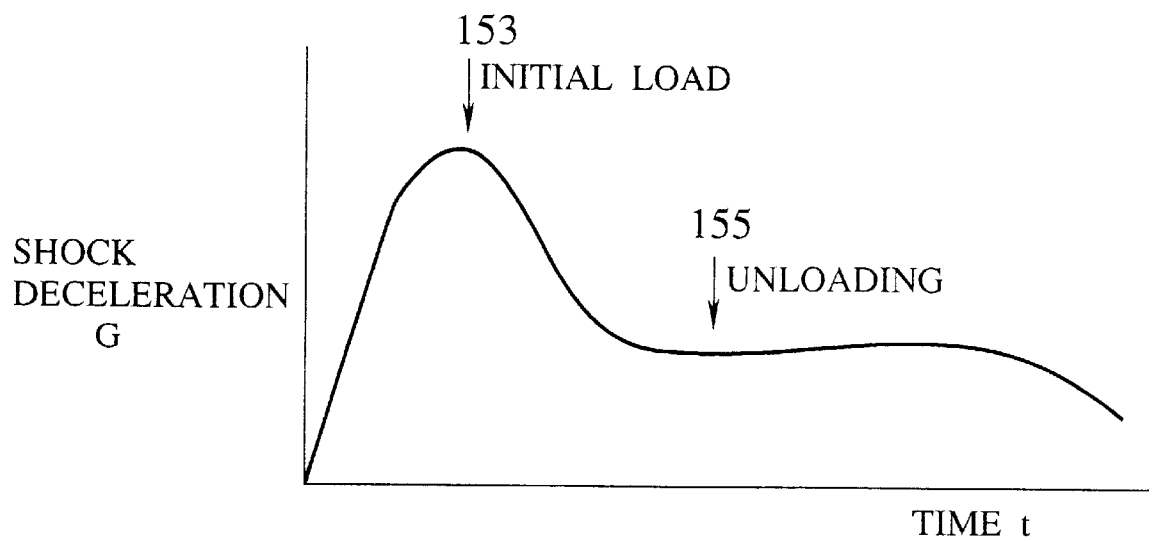
FIG. 13 is a graph showing the relation between the time elapsed from the imposition of a shock and the shock deceleration according to an embodiment of the invention.
Figure 14:
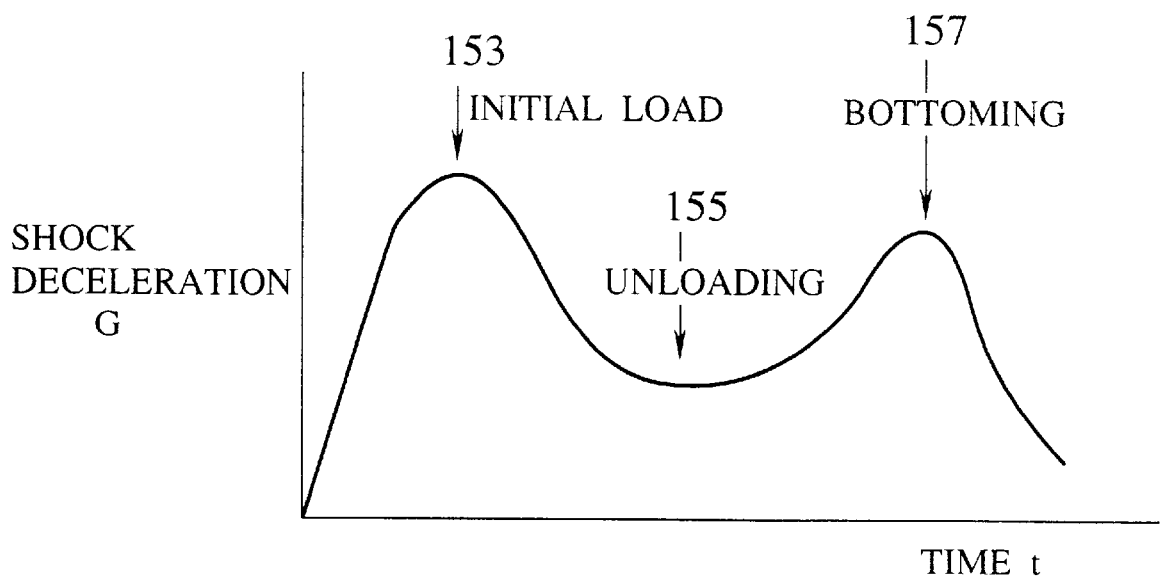
FIG. 14 is a graph showing the relation between the time elapsed from the imposition of a shock and the shock deceleration according to the prior art.

FIGS. 11 and 12 show a fourth embodiment of the invention, which is applicable to a pillar instead of to an automotive seat belt apparatus to which the first to third embodiments are applied.

FIG. 11 is a sectional view showing a center pillar 131, for example. The center pillar 131 includes an outer panel 133 and an inner panel 135 butt-jointed to each other by means of Flanges 133a, 135a. According to this embodiment, the center pillar 131 constitutes a hard member. The inner panel 135 constitutes a portion of the center pillar 131 facing the compartment. Also, a trim member 137 is mounted as a cover having a substantially U-shaped section for covering the compartment side of the hard member. The trim member 137 is coupled to the center pillar 131 by clip or the like, though not shown, at predetermined positions. The trim member 137 is formed of resin or the like and includes a front wall 137a facing the compartment and side walls 137b formed on the two sides of the front wall 137a. The walls 137a, 137b define the substantially U-shaped section of the trim member 137. Each end of the side wall 137b is provided with a flange 137c in opposed relation or butt-jointed to the flange 135a of the center pillar 131. Protrusions 139 are protruded integrally from the inner surface of the side wall 137b in the direction perpendicular to the transverse direction of the vehicle. A pawl 139a is formed at the forward end of each protrusion 139.

An energy absorbing member 141 is interposed between the trim member 137 constituting the cover and the center pillar 131 providing the hard member. The energy absorbing member 141 is formed as a hollow cylinder as in the case of FIG. 4, for example, and has a vertical wall 141c. The vertical wall 141c is extended along the transverse direction of the vehicle, perpendicular to the surface of the inner panel 135 of the center pillar 131, constituting the hard member and is configured to buckle under a pressure load not less than a predetermined value which may be applied thereto.

The vertical wall 141c has an end 141a in contact with the inner surface of the front wall 137a of the trim member 137. The other end 141b of the vertical wall 141c is in contact with the inner panel 135 of the center pillar 131. The energy absorbing member 141 has a plurality of through holes 141d formed along the periphery at the longitudinal intermediate portion thereof for engagement with the protrusions 139. Specifically, the pawls 139a of the protrusions 139 advance into the through holes 141d and engage the inner surface of the vertical wall 141c. Under a pressure load F1 applied along the transverse direction of the vehicle, the protrusions 139 provide a trigger portion which engage a part of the vertical wall 141c and accelerate the deformation of the vertical wall 141c outward (in the longitudinal direction of the vehicle).

Upon application thereto of a pressure load F1 from the compartment side, the front wall 137a is pressed toward the inner panel 135. This pressure force is applied also to the side wall 137b on the two sides of the front wall 137a as a force along the transverse direction of the vehicle. The flanges 137c at the ends of the side wall 137b are in contact with the flanges 135a of the inner panel 135 of the center pillar 131, and therefore the bending moment is exerted on the side walls 137b, so that the side walls 137b are deformed and expand in the longitudinal direction of the vehicle as shown in FIG. 12. This deformation causes the protrusions 139 to pull the vertical walls 141c of the energy absorbing member 141 longitudinally of the vehicle by means of the pawls 139a, thereby providing a momentum for plastic deformation, i.e., buckling. Thus, the energy absorbing member 141 initiates the buckling with the result that the shock energy under the pressure load F1 is absorbed.

In the process of buckling and deformation, the side walls 137b are deformed and expanded in the longitudinal direction of the vehicle away from the inner panel 135 thereby to widen the space therewith, into which the energy absorbing member 141 is buckled and deformed. The buckling and deformation of the energy absorbing member 141 can thus be accomplished smoothly, and energy is absorbed efficiently and accurately. Also, the deformation of the trim member 137 as shown in FIG. 12 may absorb the load.

Consequently, according to the present embodiment, an operation and an effect similar to those of the first embodiment can be obtained. Further, according to the present embodiment, the load can be absorbed by the center pillar 131. Also, since the energy absorbing member 141 is arranged taking advantage of the space formed between the trim member 137 and the center pillar 131, no specialized space is needed and a compact arrangement is made possible.

Further, an alternative configuration as shown in FIG. 5 can be used as the energy absorbing member 141. The structures according to the second and third embodiments are applicable also to the present embodiment. Furthermore, a front pillar, a rear pillar or the like is applicable with equal effect as the center pillar described above.

What is claimed is:

1. A vehicle energy absorbing structure comprising:
   a hard member having a portion facing a compartment;
   a cover having a substantially U-shaped section for covering the compartment side of said hard member; and
   an energy absorbing member interposed between said cover and said hard member, said energy absorbing member adapted to be subjected to plastic deformation for absorbing a shock energy; and
   wherein said cover includes therein a trigger means for providing a momentum for plastic deformation of said energy absorbing member as a result of the deformation of the cover under a pressure load not less than a predetermined value exerted on said cover.

2. A vehicle energy absorbing structure according to claim 1, wherein:
   said hard member is arranged within an area defined by said substantially U-shaped section of said cover;
   said cover has a portion adapted to be deformed away from said hard member under said pressure load; and
   said trigger means is formed to cause the plastic deformation of said energy absorbing member toward a space defined by said hard member and a portion of said cover deformed away from said hard member.

3. A vehicle energy absorbing structure according to claim 1, wherein:
   said trigger means subjects said energy absorbing member to plastic deformation in a direction toward an inner surface of said cover.

4. A vehicle energy absorbing structure according to claim 1, wherein:
   said cover includes a vertical wall extended in a direction perpendicular to a surface of said hard member;
   said trigger means is formed in said vertical wall so as to initiate an outward buckling under a pressure load not less than a predetermined value.

5. A vehicle energy absorbing structure according to claim 1, wherein:
   said energy absorbing member includes a vertical wall extended in the direction perpendicular to the surface of said hard member and adapted to buckle under a pressure load not less than a predetermined value applied thereto; and
   said trigger means is a protrusion formed in said cover for engaging at least a part of said vertical wall and accelerating a buckling of said vertical wall under a pressure load.

6. A vehicle energy absorbing structure according to claim 5, wherein:
   the ends of said vertical wall of said energy absorbing member are in contact with said cover and said hard member, respectively; and
   an end of said cover is in contact with said hard member.

7. A vehicle energy absorbing structure according to claim 4, wherein:
   said trigger means is formed at an intermediate part of said vertical wall of said cover; and
   said intermediate part of said vertical wall is so shaped as to expand outward.

8. A vehicle energy absorbing structure according to claim 4, wherein:
   an end of said vertical wall of said cover engages said hard member.

9. A vehicle energy absorbing structure according to claim 5, wherein:
   said vertical wall of said energy absorbing member defines a hollow section interposed between said hard member and said cover;
   said trigger means is a cylinder protruded from said cover to a point corresponding to the intermediate part in said vertical wall; and
   a soft foamed member is arranged to extend from an interior of said cylinder to said hard member.

10. A vehicle energy absorbing structure according to claim 1, wherein:

said hard member is a fixing member for securing a seat belt anchor plate for supporting the seat belt to a pillar panel; and said cover is a cap for covering the compartment side of said fixing member.

11. A vehicle energy absorbing structure according to claim 1, wherein:

said hard member is a vehicle frame member facing the compartment; and said cover is a trim member for covering said frame member.

12. A vehicle energy absorbing structure according to claim 7, wherein:

an end of said vertical wall of said cover engages said hard member.

* * * * *